March 10, 1970     R. COHEN     3,499,187
EXTRUSION SCREW AS WELL AS EXTRUSION MACHINES PROVIDED
WITH A SCREW IN ACCORDANCE WITH OR
SIMILAR TO THE INVENTION
Filed June 9, 1967

Inventor
RAYMOND COHEN
By
*Kenneth S. Goldfarb*
Attorney

United States Patent Office

3,499,187
Patented Mar. 10, 1970

3,499,187
EXTRUSION SCREW AS WELL AS EXTRUSION MACHINES PROVIDED WITH A SCREW IN ACCORDANCE WITH OR SIMILAR TO THE INVENTION
Raymond Cohen, 51 Rue J. B. Charcot, Courbevoie, France
Filed June 9, 1967, Ser. No. 645,025
Claims priority, application France, June 14, 1966, 65,447
Int. Cl. B29f 3/02
U.S. Cl. 18—12   3 Claims

ABSTRACT OF THE DISCLOSURE

The invention relates to an extrusion screw, i.e., a screw itself which is placed inside a cylindrical body, this cylindrical body being provided with an extrusion orifice at one of its ends, and a filling orifice so that the material introduced through the filling orifice is moved by the screw, and extruded by the extrusion orifice or head.

---

Extrusion machines are already known comprising worms. They are called "slubbers" or "extruders." They are single or multiple screw.

The role of the screw 1 (see FIGURE 1) is to forward the material introduced through the spout 2 along the body, which is provided with known heating means. During this travel, the material changes its state, and from a solid becomes pasty under the effect of the heat transmitted by the body and the shearing work of the screw. This enables the screw to force the material towards the end of the machine through the screw-plate which imparts to it its final appearance and shape.

In all these machines, an endeavor is made to accomplish this work by means of spiral threaded screws, with a variable or constant pitch, of which the volume of the threading decreases from the feed spout to the exit screw-plate (see FIGURE 1). This gives an idea of the compression rate of the screw, which is only the ratio of the passage section of the material and the two ends of the screw. Another important characteristic is the depth dimension of the threading, which is a function of the viscosity of the material and must adapt itself to the various points of the screw, with regard to the conversion curve of the material. Too hollow a screw does not shear the material, whereas a too slightly hollow screw shears too much material and risks damaging it. Hence the necessity of properly calculating the depth of the threading for a given case of extrusion. And it is well known that, for almost every material, a well defined screw profile must be provided.

In the conception of all known screws, up till now one has only been concerned with the compression rate and depth of the threading, the pitch being generally equal to the diameter of the screw. This has led to neglecting the shank of the screw, which, up till now, has only been a simple connection of lines between the two ends of the screw. It follows that for creating this compression rate, the shanks of screws are cone-shaped over their whole length, or else cone-shaped and cylindrical, or again, all possible combinations of these two definitions. But if we consider the bottom of the threading itself, we see that it is either parallel to the body (cylinder) of the extruder, or else sloped with an angle that is that of the conicity of the screw indispensable for creating the compression rate. It follows that, with such threading, if it is not one hundred percent full, and this is nearly always the case, the material is much more transported than mixed, and it is only at the exit from the screw that it is forced through a hole plate, where it undergoes a homogenizing and jellifying work. Now the forcible passage of this cold material through these holes calls for a considerable amount of power, and the quality of the extrudate frequently leaves much to be desired.

The present invention has more particularly the object of remedyinng these disadvantages and relates, to this end, to an extrusion screw characterized in that the bottom of the threading is sloped towards the axis of the screw, in regard to the displacement direction of the material, which more particularly affords a better mixing of the material during its displacement and increasing the output of the screw.

The invention also relates to extrusion machines provided with one or more screws according or similar to the invention.

The invention also applies to the characteristics arising out of the description and claims hereafter, as well as the attached drawings, in which:

In the first place, it should be understood that these drawings are essentially diagrammatic, and that the proportions of the various elements have been able to be exaggerated solely for facilitating understanding.

Figure 2:
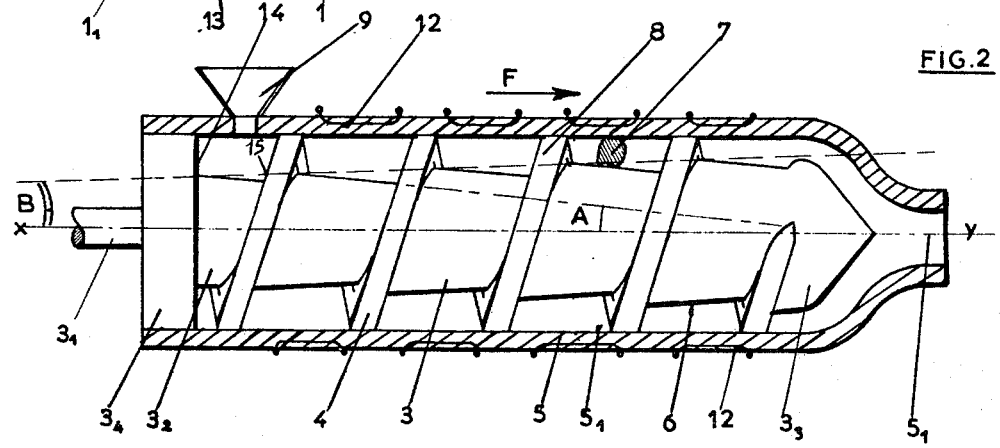
FIGURE 2 is a section of a method of embodiment of this screw.
Figure 3:
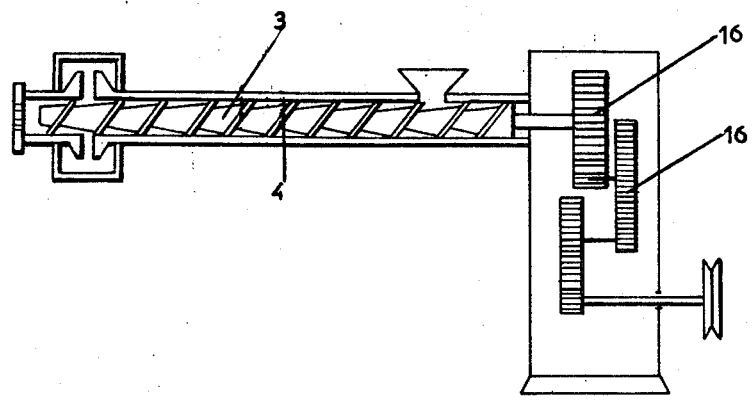
FIGURE 3 shows in diagrammatical manner, an extrusion machine according to the invention.

According to the invention, the extrusion screw 3, shown in the attached FIGURE 2, comprises a spiral threading 4, which is rotatively driven for moving the material in the direction of the arrow F.

This rotation is obtained by a driving member driving the end $3_1$ of the screw.

This rotating drive will take place by means of a reducing unit, for example, with gears 16.

In the example of FIGURE 2, the shank of the screw has a general cone-shaped appearance, the means section of this shank increasing from the end $3_2$ up to the end $3_3$ placed close to the exit $5_1$ from the cylindrical body 5. This conicity is materialized by the angle B and defines the compression rate of the screw.

Owing to this construction, the threading 4, which comes into contact by its periphery with the cylindrical body 5, has a height that decreases from the end 3 of the screw towards the end $3_3$.

According to the invention, the bottom 6 of the threading of the screw formed by the shank of this screw is sloped towards the axis Y—Y of the screw in the advancing area F of the material, so as to form an acute angle A with the axis of this screw.

The practical utility of this arrangement is as follows:

If we consider a material mass 7, during the rotation of the screw, the threading 8 will have a tendency to thrust the mass 7, and hence this mass 7 will tend to come nearer to the threading 8.

Now, in approaching the threading 8, the material mass 7 will place itself in a spot where the depth of the threading is shallower, so that this mass will be wedged between the wall 6 of the bottom of the threading and the wall $5_1$ of the cylindrical body.

On this account, the material mass will have a tendency to become sheared, i.e., drawn between the bottom 6 of the threading and the wall $5_1$ of the body, during the rotation of this screw. Moreover, we see that this mixing action occurs right along the screw, from the introducing area for the material through the funnel 9 up to the last threading near to the aperture $5_1$ of the extrusion head.

Figure 1:
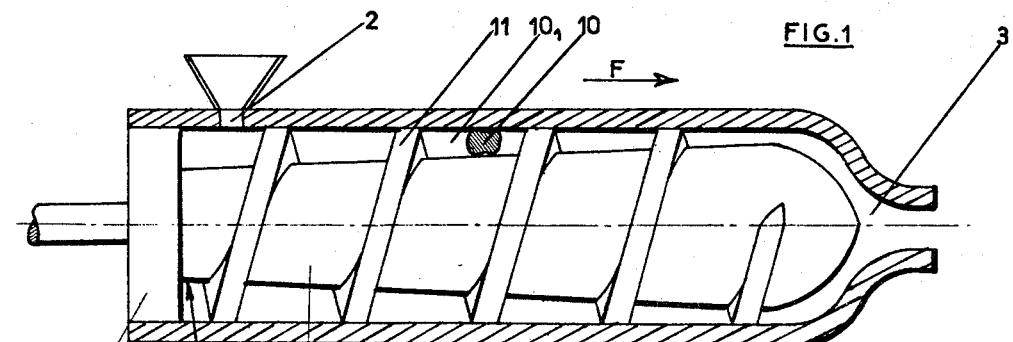

In this connection, we can make the comparison with known screws of which one example is shown in FIGURE 1.

Actually, in this case, when the material mass 10 is moved in the direction of the arrow F by the rotating of the screw, this material mass tends to come closer to the threading 11 which thrusts it.

Consequently, the mass 10 tends to place itself automatically in an area 10 which has a greater depth of threading, which reduces the wedging force of the material 10, and thus prevents its shearing.

It is chiefly for this reason that in known machines, the material emerging through the orifice 3 is worked in an incomplete manner and has unmelted areas.

On the other hand, owing to the wedging and thus the considerable shearing of the material in machines comprising a screw similar to that of FIGURE 2, the material is worked over the entire length of the screw, which helps to make a suitable mixing and thus the material is conveyed in a pasty and homogeneous state towards the screw-plate.

We would also point out the wedging effect, created by the slope of the bottom of the threading, which obliges the material to come into contact with the hot cylinder, from whence a better heat transmission.

Also, the screw according to the invention can be employed for any material, because, whatever this material may be, there is always one side, i.e., threading depth, where it is efficaciously worked.

This efficient mixing can be also deduced from the considerable self-heating of the material which cooperates with the heat given off by the heating elements 12.

With a screw according to the invention, we also obtain a better output. Actually, with known screws, the material is thrust towards the extrusion head whereas it is not in a homogeneous pasty condition. On this account, the power absorbed is used or almost totally used for forcing material masses towards the exit.

On the other hand, according to the invention, the material is worked over the entire length of the screw, owing to the wedging effect which occurs automatically, so that it reaches the exit in a worked condition, i.e., in a homogeneous pasty state. On this account, the motive power required is considerably less.

Moreover, with the known screw, it often happens that the screw breaks at its base at 13, this breaking coming from the mechanical break line that normally occurs at the junction of the shank 1 of the screw with the base $1_1$ at the area 13 which is the smallest diameter area of the screw.

On the other hand, with the screw 3 according to the invention, the shank of this screw is connected to the base $3_4$ by an area 14 whose diameter is intermediate between the diameter of the base $3_4$ and the minimum diameter found at 15 at the base of the first threading. The screw according to the invention thus has an enhanced solidity, making the maximum use of the natural resilience of the material forming the screw.

The invention will obviously relate to extrusion screws comprising the characteristic described above, and this whatever the kind of screw, whether it has one or several stages, or that it comprises—or not—areas of which the shank is cylindrical, while retaining the angle of slope that may be constant or progressively variable—or not—for one and the same screw.

It should also be noted that nothing prevents the screw according to the invention from being bored internally, partly or totally, for its heat conditioning.

Also, the invention will obviously relate to extrusion machines provided with the screw according to the invention, whether it refers to machines with one or more screws, with or without removal of gas.

Of course, the invention is not restricted to the examples of embodiment described and shown above, from which other shapes and other methods of embodiment can be provided, without going outside of the scope of the invention.

I claim:

1. An extrusion device comprising a screw having a longitudinal axis and a shank provided with thread means thereon including a plurality of threads, said screw having shank areas on at least part of its length, each shank area being situated between two consecutive of said threads, each shank area being individually sloped towards said axis in the direction of the advancing thread and with an upstream edge at the base of the upstream thread and a downstream edge at the base of the downstream thread in the advancing direction of said thread, the depth of the thread level with each upstream edge of a shank area being less than the depth of the thread level with the downstream edge of the shank area which precedes it in the direction of the advancing thread.

2. An extrusion device according to claim 1, wherein said shank is substantially of a cone shape, the mean diameter of said shank increasing in increments in the direction of advance of said threading.

3. An extrusion device according to claim 1, including a hollow cylindrical body of very slightly greater diameter than said threading, said body having a material filling orifice and an extrusion orifice at the opposite end of said body so that said threading advances material from said filling orifice to said extrusion orifice with said sloped sections increasing the shearing effect on material being worked upon.

References Cited

UNITED STATES PATENTS

| | | | |
|---|---|---|---|
| 1,904,884 | 4/1933 | Royle | 18—12 |
| 2,411,971 | 12/1946 | MacMillin et al. | 18—12 |
| 2,443,289 | 6/1948 | Bailey | 18—12 |
| 3,123,860 | 3/1964 | Vesilind | 18—12 |
| 3,145,420 | 8/1964 | Joukainen et al. | 18—12 |

WILLIAM J. STEPHENSON, Primary Examiner